(12) United States Patent
Forbes

(10) Patent No.: US 9,739,012 B1
(45) Date of Patent: Aug. 22, 2017

(54) AUGMENTED REALITY OF PAPER SHEET WITH QUALITY MEASUREMENT INFORMATION

(71) Applicant: Honeywell Limited, Mississauga (CA)

(72) Inventor: Michael Forbes, North Vancouver (CA)

(73) Assignee: Honeywell Limited, Mississauga (CA)

( * ) Notice: Subject to any disclaimer, the term of this patent is extended or adjusted under 35 U.S.C. 154(b) by 0 days.

(21) Appl. No.: 15/050,449

(22) Filed: Feb. 22, 2016

(51) Int. Cl.
*D21G 9/00* (2006.01)
*G06T 7/00* (2017.01)

(52) U.S. Cl.
CPC ......... *D21G 9/0027* (2013.01); *D21G 9/0036* (2013.01); *G06T 7/0004* (2013.01); *G06T 2207/30124* (2013.01)

(58) Field of Classification Search
CPC ........................... D21G 9/0027; G01N 33/343
USPC .................................................. 162/198, 263
See application file for complete search history.

(56) References Cited

U.S. PATENT DOCUMENTS

| | | | |
|---|---|---|---|
| 5,400,258 A | 3/1995 | He | |
| 6,086,237 A * | 7/2000 | Gorinevsky | G05B 13/042 700/127 |
| 6,154,561 A * | 11/2000 | Pratt | G06T 7/001 345/904 |
| 6,408,257 B1 | 6/2002 | Harrington | |
| 6,807,510 B1 | 10/2004 | Backstrom et al. | |
| 7,042,421 B2 | 5/2006 | Hobgood et al. | |
| 7,146,238 B2 | 12/2006 | Burma | |
| 8,224,476 B2 * | 7/2012 | Chu | D21G 9/0027 162/198 |
| 8,397,181 B2 | 3/2013 | Hartman et al. | |
| 2003/0171838 A1 * | 9/2003 | Chen | D21G 9/0054 700/128 |
| 2004/0201669 A1 * | 10/2004 | Guha | G01N 21/89 348/126 |
| 2004/0221978 A1 * | 11/2004 | Tran | D21G 9/0027 162/198 |
| 2005/0276462 A1 * | 12/2005 | Silver | G06T 7/0008 382/141 |
| 2007/0039705 A1 * | 2/2007 | Stewart | D21G 9/0045 162/198 |
| 2009/0060316 A1 * | 3/2009 | Ruuska | B65H 26/025 382/141 |
| 2009/0322671 A1 | 12/2009 | Scott et al. | |
| 2013/0252669 A1 | 9/2013 | Nhiayi | |
| 2014/0110871 A1 | 4/2014 | Backstrom et al. | |

* cited by examiner

*Primary Examiner* — Mark Halpern
(74) *Attorney, Agent, or Firm* — Charles H. Jew

(57) ABSTRACT

Augmented reality techniques for monitoring and controlling continuous sheetmaking systems superimpose real-time sheet quality measurements onto images of the sheet and/or machine during production. A portable, hand-held computer device that is equipped with a camera, such as a tablet or smartphone, enables an operator to direct the device at the sheet along specific locations of the papermaking machine and view an indication of one or more quality measurements that are superimposed over the image of the paper. The operator can assess and resolve problems associated with the sheet being produced and/or machine.

14 Claims, 4 Drawing Sheets

AUGMENTED REALITY OF PAPER SHEET WITH QUALITY MEASUREMENT INFORMATION

FIELD OF THE INVENTION

The present invention generally relates to techniques for monitoring and controlling continuous sheetmaking systems such as a papermaking machine and more specifically to augmented reality that generates paper quality measurements that are superimposed on an image, such as video image, of the paper sheet.

BACKGROUND OF THE INVENTION

In the manufacture of paper on continuous papermaking machines, a web of paper is formed from an aqueous suspension of fibers (stock) on a traveling mesh of papermaking fabric and water drains by gravity and suction through the fabric. The web is then transferred to the pressing section where more water is removed by pressure and vacuum. The web next enters the dryer section where steam heated dryers and hot air complete the drying process. The paper machine is, in essence, a water removal, system. A typical forming section of a papermaking machine includes an endless traveling papermaking fabric or wire, which travels over a series of water removal elements such as table rolls, foils, vacuum foils, and suction boxes. The stock is carried on the top surface of the papermaking fabric and is de-watered as the stock travels over successive de-watering elements to form a sheet of paper. Finally, the wet sheet is transferred to the press section of the papermaking machine where enough water is removed to form a sheet of paper. Many factors affect the quality of the paper produced.

Papermaking machine operators often experience quality problems related to discrete portions of the paper sheet being produced. For example, wet streaks and light or heavy areas can develop on the paper. These quality problems are often detected by the quality control system but they are typically not evident to the operators when they simply observe the paper. To troubleshoot and understand the source(s) of the paper quality problems, it would be helpful to know exactly where the problems are located when an operator visually inspects the physical sheet, that is, when viewing the paper at the reel or other section along the papermaking machine.

SUMMARY OF THE INVENTION

The present invention is based in part on the recognition that augmented reality implemented on a portable computer device that is equipped with a camera enables operators to inspect the paper sheet at specific locations along the papermaking machine and view an indication of one or more quality measurements that are superimposed over the image of the paper. In particular, with the present invention, augmented reality software on a tablet or smart phone allows the operator to point the device at the paper sheet at specific locations and quickly diagnose the problem. Operators can examine the continuous sheet in real time to determine where streak locations, weight problems, or other sheet quality issues exist based on the quality control system profiles, color map displays and other sheet information displayed.

In one aspect, the invention is directed to a method of monitoring the production of a continuous sheet in a sheetmaking machine that includes the steps of:

(a) capturing an image of the continuous sheet with an imaging device;

(b) identifying the position of the image with respect to the sheetmaking machine; and (c) displaying real-time sheet information that overlays the image.

In another aspect, the invention is directed to an augmented reality system, which is typically hand-held, for monitoring the production of a continuous sheet that includes:

(i) a processor, (ii) a display communicatively coupled to the processor, and (iii) an imaging device communicatively coupled to the processor, wherein the imaging device is configured to capture an image of the continuous sheet and wherein the processor is configured to identify the position of the image with respect to the sheetmaking machine and display real-time sheet information that overlays the image.

While the invention will be illustrated as being implemented in papermaking, it is understood that the invention is applicable in other continuous sheet making processes such as, for example, in the manufacturer of rubber sheets, plastic film, metal foil, and the like.

DETAILED DESCRIPTION OF PREFERRED EMBODIMENTS

Figure 1:
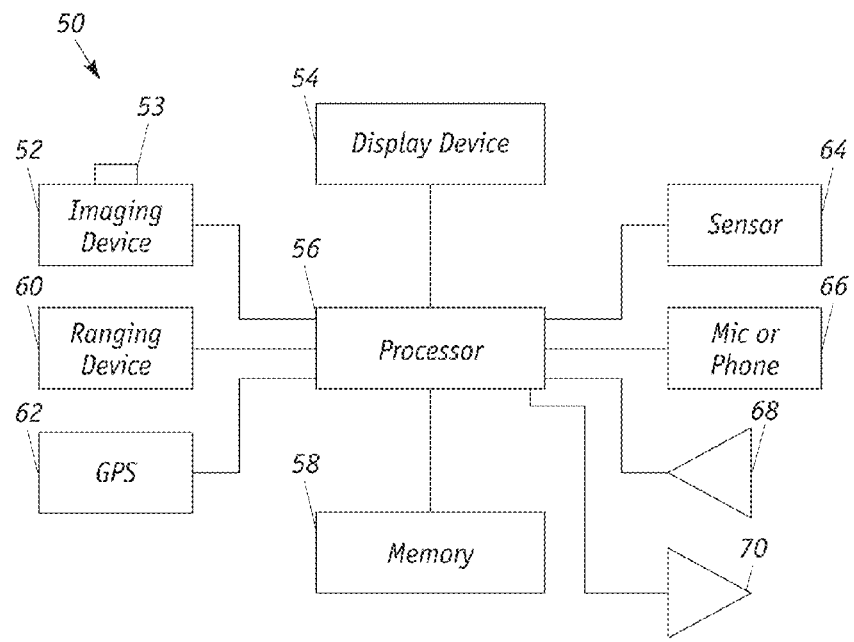
FIG. 1 is a block diagram of an augmented reality system.

FIG. 1 is an embodiment of an augmented reality system 50 for recognizing a flat sheet, accessing current scanner measurements for the sheet and displaying measurement information that is superimposed over an image of the sheet in real time. System 50 includes an imaging device 52 that is equipped with lens 53, a display device 54, a processor 56, and a memory medium 58. Paper quality measurement information is stored in the memory medium 58. For a particular grade of paper being produced with a specific papermaking machine, the paper quality measurement information can include, for example, color maps and profiles of paper produced under different conditions. In addition, the information pertains to different specific locations along the machine direction of a papermaking machine.

Suitable imaging devices 52 include a digital camera and a video camera that captures video in a frame-by-frame manner. System 50 can also include a ranging device 60 which is configured to determine a distance from ranging device 60 to a sheet and other surfaces and a global positioning system receiver (GPS) 62 which is configured to determine the position of system 50. The system 50 can include a sensor 64 for recognizing actions by an operator and a microphone 66 for capturing voice commands or inputs from an operator. The processor 56 can be configured for speech recognition and gesture detection so that hand or finger gestures by the operator are identified as user commands to operate augmented reality system 50.

Finally, system 50 can include a receiver 68 for receiving data from a quality control system of a papermaking machine and a transmitter 70 for transmitting data to the quality control system. For instance, during paper production, various scanners are employed to measure paper quality. The measurements can be transmitted to the augmented reality system 50 and stored in memory device 58.

As shown in FIG. 1, the various components of augmented reality system 50 are communicatively coupled to the processor 56. It is contemplated that commercially available portable computer devices that are equipped with cameras, such as tablets and smartphones, can be readily modified and programmed to function as an augmented reality system of the present invention.

Figure 2:
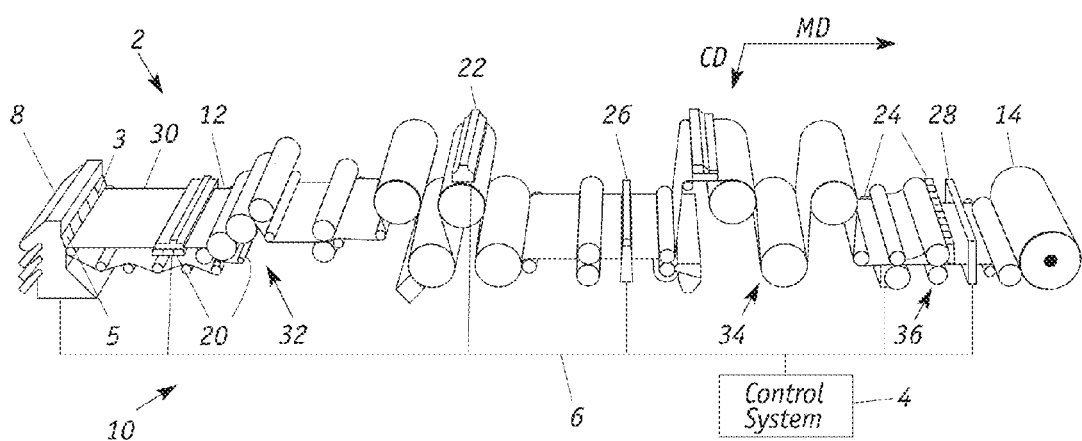
FIG. 2 is a schematic illustration of a papermaking system.

The augmented reality system will be illustrated by implementing the technique in a sheetmaking system 10 that includes papermaking machine 2, control system 4 and network 6 as illustrated in FIG. 2. The papermaking machine 2 produces a continuous sheet of paper material 12 that is collected in take-up reel 14. The paper material 12, having a specific width, is produced from a pulp suspension feedstock, comprising of an aqueous mixture of wood fibers and other materials, which undergoes various unit operations that are monitored and controlled by a quality control system 4. The network 6 facilitates communication between the components of system 10.

The papermaking machine 2 includes a headbox 8, which distributes an aqueous pulp suspension uniformly across the machine onto a continuous screen or wire 30 that is moving in the machine direction (MD). Headbox 8 includes slice openings through which the pulp suspension is distributed onto screen or wire 30 which comprise a suitable structure such as a mesh for receiving a pulp suspension and allowing water or other materials to drain or leave the pulp suspension. The formation of the paper sheet 12 is influenced by a plurality of linear actuators 3 extending in the cross direction across the sheet 12 of paper being formed. Actuators 3 control the sheet's weight in the cross direction (CD). Sensors located downstream from the actuators measure the properties of the sheet. The feedstock is fed from the head box through a gap or elongated orifice 5 onto a wire section 30. The orifice or gap is a relatively narrow opening that extends across the width of the machine. Weight profile control in such an arrangement is achieved by locally adjusting the position of the slice lip across the machine with motorized linear actuators 3 to vary the dimensions of the gap or orifice immediately adjacent the actuator. As used herein, the "wet end" forming portion of sheetmaking system 10 comprises headbox 8 and wire 30 and those sections before the wire 30, and the "dry end" comprises the sections that are downstream from wire 30.

Sheet 12 then enters a press section 32, which includes multiple press rolls where sheet 12 travels through the openings (referred to as "nips") between pairs of counter-rotating rolls in press section 32. In this way, the rolls in press section 32 compress the pulp material forming sheet 12. This may help to remove more water from the pulp material and to equalize the characteristics of the sheet 12 on both of its sides.

As sheet 12 travels over a series of heated rolls in dryer section 34, more water in sheet 12 is evaporated. A calendar 36 processes and finishes sheet 12, for example, by smoothing and imparting a final finish, thickness, gloss, or other characteristic to sheet 12. Other materials (such as starch or wax) can also be added to sheet 12 to obtain the desired finish. An array of induction heating actuators 24 applies heat along the cross direction (CD) to one or more of the rollers to control the roll diameters and thereby the size of the nips. Once processing by calendar 36 is complete, sheet 12 is collected onto reel 14.

Sheetmaking system 10 further includes an array of steam actuators 20 that controls the amount of hot steam that is projected along the CD. The hot steam increases the paper surface temperature and allows for easier cross direction removal of water from the paper sheet. Also, to reduce or prevent over drying of the paper sheet, paper material 14 is sprayed with water in the CD. Similarly, an array of rewet shower actuators 22 controls the amount of water that is applied along the CD.

In order to control the papermaking process, selected properties of sheet 12 are continuously measured and the papermaking machine 2 adjusted to ensure sheet quality. Typical physical characteristics of paper that are can be measured include, for example, thickness, basis weight, moisture content, chemical composition, surface roughness, gloss, caliper, and crepe pattern surface features. CD control may be achieved by measuring sheet properties using one or more scanners 26, 28 that are capable of scanning sheet 12 and measuring one or more characteristics of sheet 12. For example, scanner 28 could carry sensors for measuring the dry weight, moisture content, ash content, or any other or additional characteristics of sheet 12. Scanner 28 includes suitable structures for measuring or detecting one or more characteristics of sheet 12, such as a set or array of sensors. A scanning set of sensors represents one particular embodiment for measuring sheet properties. An array of stationary sensors can be used instead. Scanner 28 is particularly suited for measuring the dry end dry weight and ash content of the paper product.

Measurements from scanners 26 and 28 are provided to control system 4 that adjusts various operations of papermaking machine 2 that affect machine direction characteristics of sheet 12. A machine direction characteristic of sheet 12 generally refers to an average characteristic of sheet 12 that varies and is controlled in the machine direction. In this example, control system 4 is capable of controlling the dry weight of the paper sheet by adjusting the supply of pulp to the headbox 8. For example, control system 4 could provide information to a stock flow controller that regulates the flow of stock through valves and to headbox 8. Control system 4 includes any hardware, software, firmware, or combination thereof for controlling the operation of the sheetmaking machine 2 or other machine. Control system 4 can, for example, include a processor and memory storing instructions and data used, generated, and collected by the processor.

Figure 3:
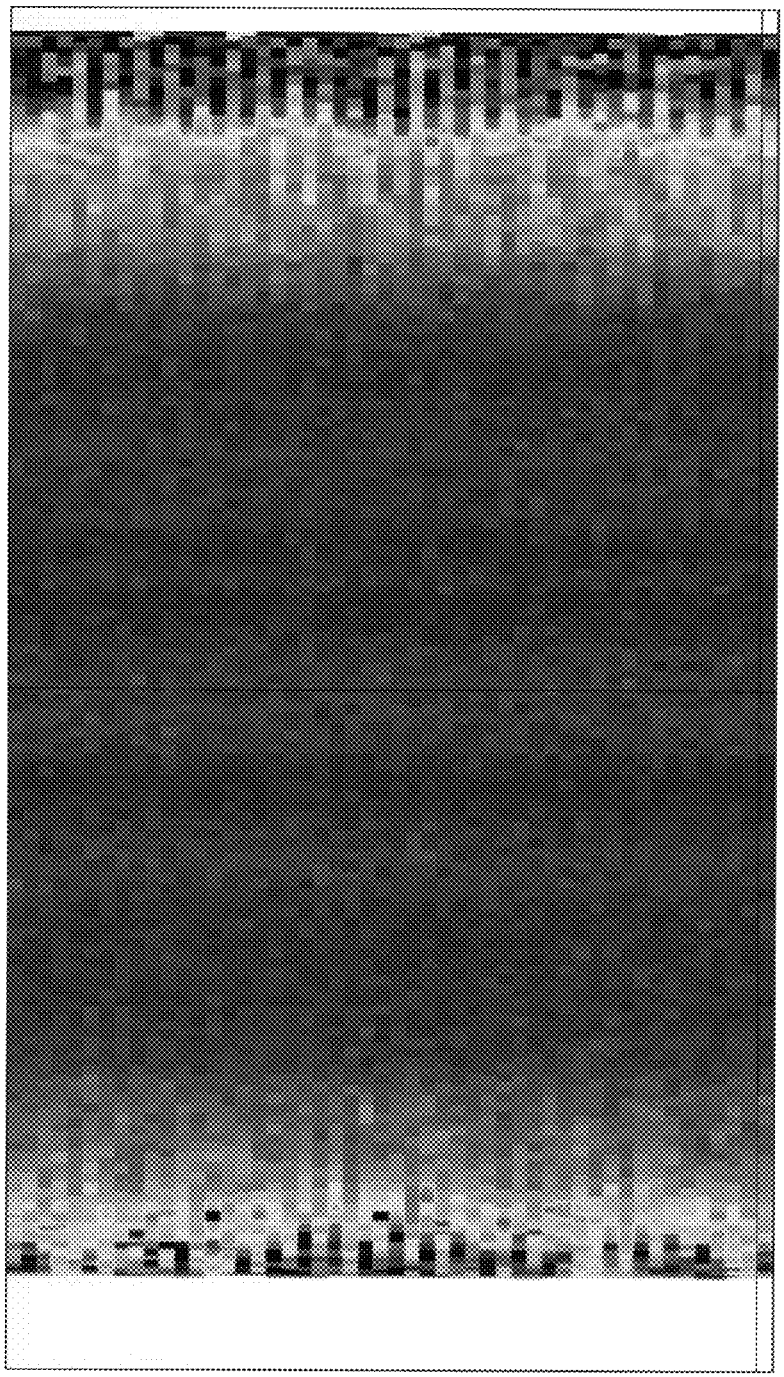
FIG. 3 depicts measurements of a sheet characteristic that are presented in the form of a two-dimensional map.

CD scanner sheet property measurements are stored for future reference and/or accessed for real-time observation and analysis. FIG. 3 shows a map which is a compilation of CD measurements over a period of time. Each line across the map is a set a measurements across the sheet taken by one scan where the different measurement values are represented by different gradations in complexion. In practice, for ease of observation, the measurement values are usually represented by different colors and the maps are commonly referred to as "color maps". In FIG. 3, the most recent scan is at the bottom and the oldest one on top. The legend on the upper left shows a scale by which physical measurements, such as a surface property or basis weight, are converted to complexion or color according to the scale. The highest measured values are represented by the top complexion.

Figure 4:
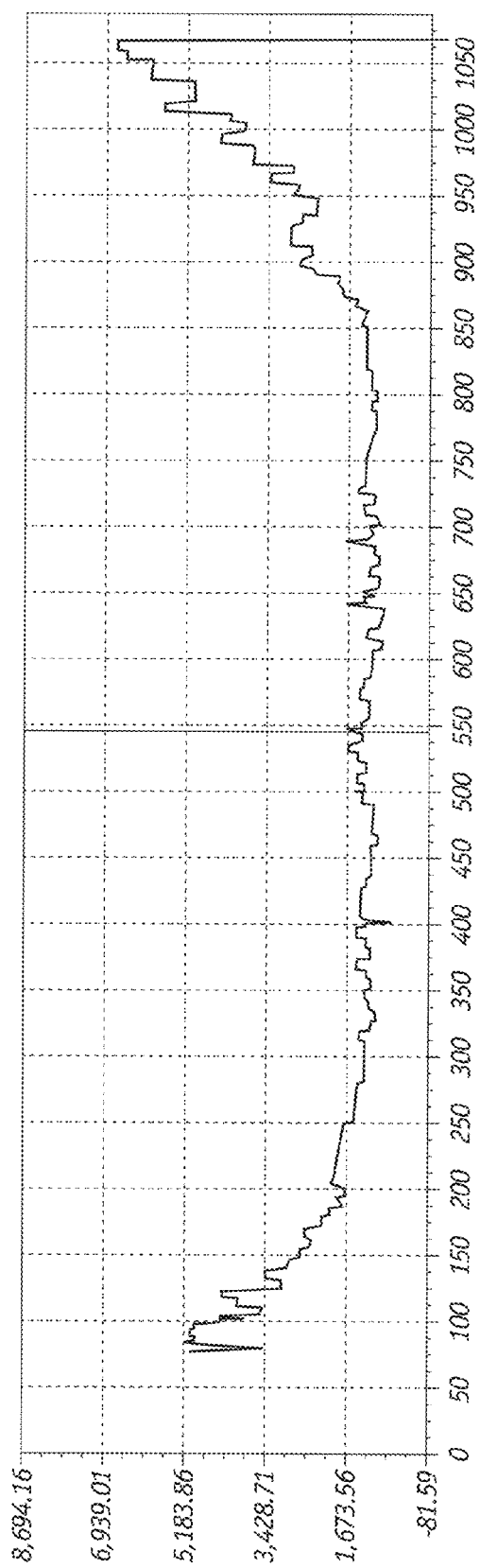
FIG. 4 is a cross directional profile of a sheet characteristic.

FIG. 4 shows a drawing of a paper sheet with a CD profile of values of a paper property superimposed onto the drawing. One embodiment of the present invention employs augmented reality to create the actual picture of the paper sheet and to superimpose the CD profile onto the picture.

With the present invention, an operator can point a camera from the handheld augmented reality device at the paper 12 at any point along the papermaking machine from the headbox 8 to the reel 14 as shown in FIG. 2. Augmented reality software allows the operator to select measurements from the scanners 26 and/or 28 to be superimposed onto the image. When scanner measurements identify sheet problems, the invention allows the operator to quickly and precisely identify where on the sheet the problems emanate and to take corrective action. For example, the operator could diagnose to determine if the problems and/or unusual areas of the sheet are attributable to mechanical equipment problems such as the heated rolls in the dryer section 34, headbox 8, the wire 30, and/or the rewet shower actuators 22.

Figure 5:
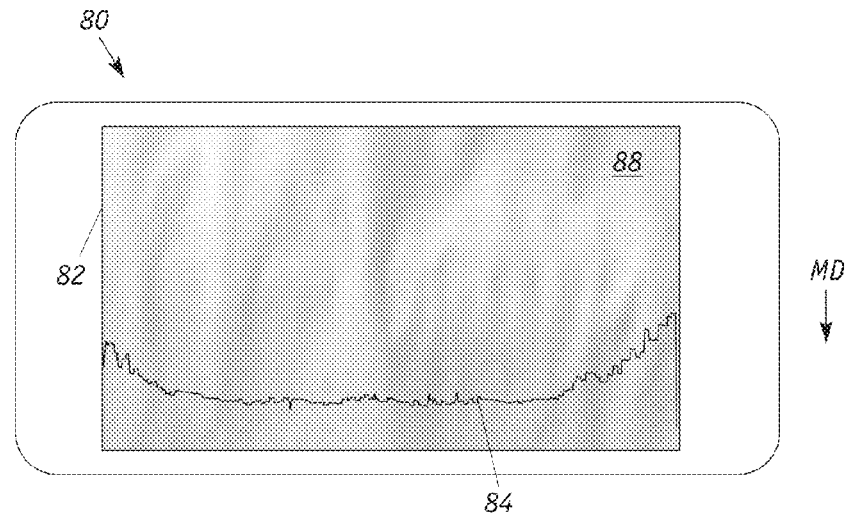
FIG. 5 illustrate a smartphone incorporating the augmented reality system to analyze paper being manufactured in a papermaking system.

FIG. 5 shows a smartphone 80 that incorporates the components of the augmented reality system shown in FIG. 1. Typical smartphones are built on a mobile computing platform with advanced computing ability and connectivity. The smartphones incorporate the functions of portable media players, low-end compact digital cameras, pocket video cameras, and GPS navigation units. Smartphones typically also include high-resolution touchscreens, web browsers that can access and properly display standard web pages, and high-speed data access via Wi-Fi and mobile broadband links. Application programming interfaces on smartphones allow third-party applications to better integrate with the phone's operating system and hardware.

In one application of the present invention, an operator directs the camera lens 53 (FIG. 1) of a smartphone toward the wire of the papermaking machine so as to take a still image or record video of a portion of the paper at the wet end. As shown in FIG. 5, the smartphone 80 has a display device or touch screen 82 that shows an image 88 of portion of paper that is moving in the MD. Smartphone 80 can be equipped with edge detection techniques that can determine the position of image of the paper 88 along the cross direction from the edge of wire 30 (FIG. 2). In addition, a ranging device 60 and GPS 62 (FIG. 1) can be employed to determine the position of image 88 relative to the machine direction position of papermaking machine. For example, ranging device 60 is oriented so that it determines the distance from the smartphone 80 user to the wire 30. In this fashion, the exact location along the continuous sheet on the wire 30 where the image 88 is taken can be identified and automatically entered into the smartphone and thereafter the location is transmitted to control system 4 (FIG. 2).

The camera would take the paper sheet image recorded by the portable device and using the edge detection and/or some other image processing algorithm determine the part of the image containing the paper sheet. Once the sheet location is determined and the software could access the quality control system measurements and superimpose a color map, profile, or other type of plot over the sheet image. The operator is able to view the composite image of the physical paper sheet with the quality measurement information superimposed. The operator can select from various sheet information to overlay on image 88. As shown in FIG. 5, the CD thickness profile 84 of the paper as measured by a scanner is displayed.

The present invention is particularly suited for identifying the source(s) of sheet production disturbance. By having the CD profile, color map, or other information blended with the actual sheet image, an operator can locate and determine the cause of the problem. The source may be a mechanical malfunction or defect on the papermaking machine that can be readily corrected.

Figure 6:
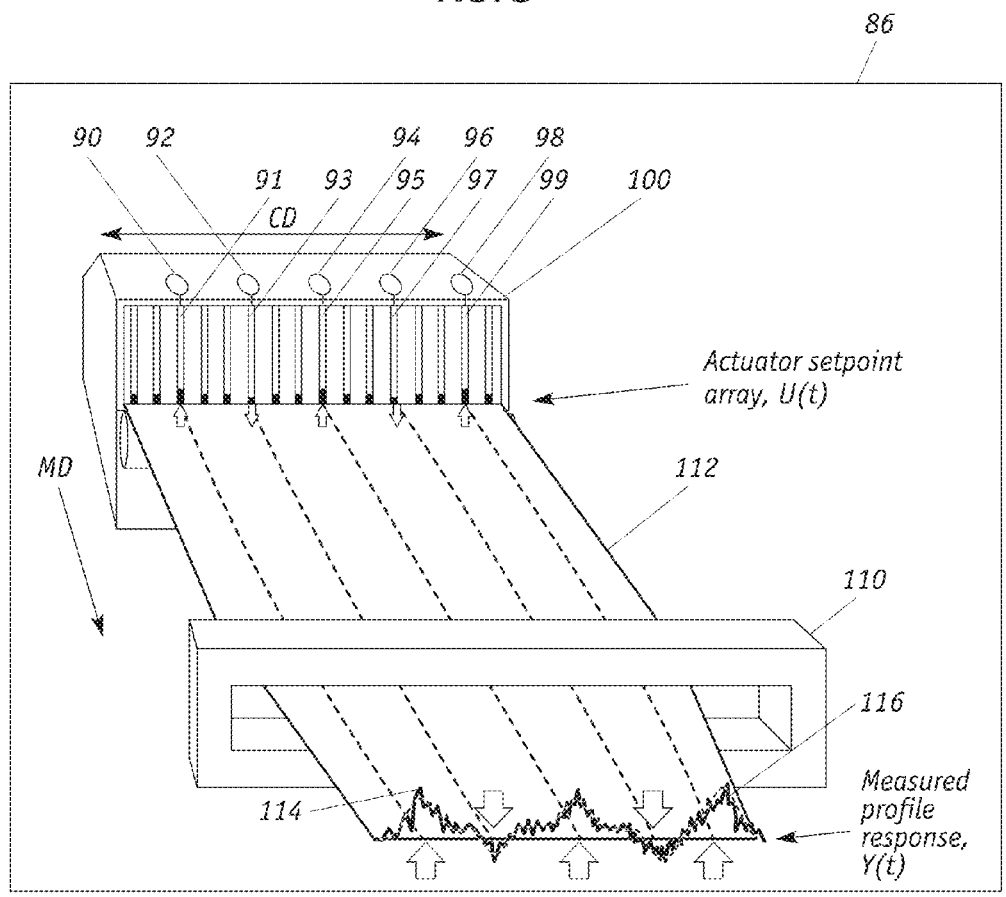
FIG. 6 shows a screen of a smartphone with an image of a papermaking machine with actuator setpoint profile and a measured profile overlaying the image.

In the case where the production problems relate to actuator function, an operator can view the operations of CD actuators and corresponding CD sheet property profile simultaneously as the operator makes adjustments to the actuators to correct the problem. FIG. 6 shows screen 86 from a smartphone depicting a machine for producing continuous web 112 of paper that includes a headbox 100 that is equipped with actuators that are arranged to control the discharge of feedstock onto a supporting web. The web is trained to travel in the machine direction (MD) toward the dry end. A scanning sensor (not shown) is mounted on frame 110 for periodically traversing the web in the cross direction (CD) while measuring its properties. The scanning sensor is typically located at the dry end of the process and, therefore, is at a substantial distance from headbox 100. For illustrative purposes, other components of the papermaking machine are not shown.

In normal operations, the quality control system provides output signals that are indicative of the magnitude of measured sheet properties for regulating control devices at various stages of the papermaking process so that the final sheet product meet specifications. In practice, control devices that are associated with sheet making machines normally include a series of actuator systems arranged in the CD. For example, in a typical headbox, the control device is a flexible member or slice lip that extends laterally across a small gap at the bottom discharge port of the headbox. The slice lip is movable for adjusting the area of the gap and, hence, for adjusting the rate at which feedstock is discharged from the headbox. A typical slice lip is operated by a number of actuator systems that operate to cause localized bending of the slice lip at spaced-apart locations in the CD. The localized bending of the slice lip member, in turn, determines the width of the feed gap at the various slices locations across the web.

A technique for controlling sheetmaking machines adjusts actuators using measurement signals provided by scanning sensors. In the case of CD control, common control scheme measures values at selected CD locations on a sheet and then compares those measured values to target or setpoint values. The difference for each pair of measured and setpoint values—the error—can be used for algorithmically generating appropriate outputs to CD control actuators to minimize the error. In such systems, a measurement zone is defined as the cross direction portion of sheet which is measured and used as feedback control for a cross direction actuator zone, and a control zone is defined as the portion of the sheet affected by a cross direction actuator zone.

In practice, it is often difficult to control sheetmaking machines by adjusting actuators using measurement signals provided by scanning sensors. The difficulties particularly arise because the scanning sensors are separated from the control actuators by substantial distances in the MID. Because of such separations, it is difficult to determine which measurements zones are associated with which actuator zones. Such difficulties are referred to as alignment problems in the papermaking art. Another difficulty is that the effect of each actuator is not always limited within the corresponding control zone but spans over a few control zones. This effect is normally referred to as interzone coupling.

With the present invention as shown in FIG. 6, an operator can visualize the performance of a set of independently operated actuators and the resulting sheet product CD measurements at the same time. In this example, headbox 100 is equipped with a plurality of actuators that are arranged at spaced-apart locations for causing local intervals of displacement of the slice lip members. The actuators control the extent to which a flexible slice lip member extends across a discharge gap at the base of headbox 100.

As illustrated, actuators 90, 92, 94, 96 and 98 manipulate slice lip members 91, 93, 95, 97 and 99, respectively. In practice, the headbox can have more than fifty actuators and corresponding slice lip members arranged across the width of the sheet. During operations of the papermaking machine, the actuator setpoint array establishes the level of feedstock discharge through the gaps of each slice lip member and the resulting profile response 114 is measured at frame 110. With the present invention, the operator is able to adjust one more actuators and observe the effects of which the adjustments have on the measured profiled. In this instance, actuators 90, 94 and 98 are manipulated to raise slice lip members 91, 95, and 99 respectively to increase the flow of feedstock through the corresponding gaps while actuators 92 and 96 are manipulated to lower slice lip members 93 and 97, respectively to decrease the flow of feedstock through the corresponding gaps. The resulting measured profile 116 which is superimposed on the paper allows the operator to regulate the actuators and execute other corrective actions as necessary to achieve the desired measured profile.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of monitoring the production of a continuous sheet in a sheetmaking machine, by an operator using a handheld portable computer device that includes an imaging device and display device, that comprises the steps of:
   (a) capturing an image of the continuous sheet with the imaging device;
   (b) identifying the position of the continuous sheet with respect to the sheetmaking machine;
   (c) displaying the image of the continuous sheet on the display device;
   (d) displaying real-time sheet information that overlays the image of the continuous sheet on the display device; and
   (e) visually analyzing the real-time sheet information to determine whether the continuous sheet is being produced within required specifications.

2. The method of claim 1 wherein the real-time sheet information comprises graphical images and/or textual information relating to one or more physical characteristics of the continuous sheet.

3. The method of claim 1 wherein step (d) comprises accessing a database with the handheld portable computer device and searching the database to find the real-time sheet information that is associated with the image of the continuous sheet.

4. The method of claim 1 further comprising accessing data with the handheld portable computer and retrieving the data from a quality control system operating the sheetmaking machine.

5. The method of claim 1 further comprising measuring sheet physical characteristics of the continuous sheet and step (d) comprises displaying real-time information of the sheet physical characteristics.

6. The method of claim 1 further comprising step (f) of executing corrective actions.

7. The method of claim 6 wherein the sheetmaking machine has a plurality of actuators that affect the operating parameters and one or more actuators are adjusted to modify the operating parameters.

8. The method of claim 7 further comprising step (g) of displaying actuator operating parameters.

9. The method of claim 8 wherein the actuator operating parameters comprise an actuator setpoint array.

10. The method of claim 1 wherein the sheetmaking machine is a papermaking machine and the real-time sheet information comprises a physical characteristic of paper that is selected from the group consisting of thickness, basis weight, moisture content, chemical composition, surface roughness, gloss, caliper, crepe pattern surface features and combinations thereof.

11. The method of claim 1 wherein the sheetmaking machine is a papermaking machine and the continuous sheet comprises paper that moves in a machine direction and step (a) comprises capturing an image of the paper along a cross direction at a specific location of the papermaking machine.

12. The method of claim 11 wherein step (d) displays real-time paper quality measurements that are measured in the cross direction.

13. The method of claim 12 wherein the paper quality measurements are presented as a cross direction profile that is aligned with the image of the paper.

14. The method of claim 1 wherein the handheld portable computer device comprises an augmented reality system, wherein steps (a) through (d) are implemented with the handheld portable computer device and wherein in step (e) the operator examines the image of the continuous sheet in real time along with the real-time sheet information to determine whether the continuous sheet is being produced within required specifications.

* * * * *